United States Patent Office 2,739,150
Patented Mar. 20, 1956

2,739,150

PROCESS FOR PREPARING ADDITION COMPOUNDS OF SULFUR TRIOXIDE AND TERTIARY ORGANIC BASES

John Taras, Alpha, N. J., assignor to General Aniline & Film Corporation, New York, N. Y., a corporation of Delaware No Drawing. Application June 19, 1951,
Serial No. 232,473

4 Claims. (Cl. 260—247.1)

The present invention relates to addition compounds of sulfur trioxide with tertiary organic bases by the reaction of the base with sulfur trioxide in the absence of an inert anhydrous solvent.

Addition products of sulfur trioxide and tertiary organic bases have been found to be of value in the aqueous esterification of leuco vat dyestuffs to the corresponding leuco sulfuric acid esters. For example, addition compounds of sulfur trioxide with tertiary organic bases having a dissociation constant of at least $1 \times 10^{-7}$ at 25° C. are recommended for use in the aqueous esterification of vat dyes in United States Patents No. 2,396,582 granted March 12, 1946, and No. 2,403,226 granted July 2, 1946. On the other hand, addition products of sulfur trioxide with pyridine or α-picoline are recommended for such esterification in my United States Patent No. 2,507,944 granted May 16, 1950.

A number of methods are known for the preparation of the addition products of sulfur trioxide and tertiary organic bases but each method involves some step which is either uneconomical or impractical for large-scale production. For example, processes involving aqueous solution for either the reaction or the purification are disadvantageous for the reason that the tertiary base-sulfur trioxide addition compound is rather unstable in acid medium at elevated temperatures, and generally undergoes decomposition upon drying.

Certain procedures recommend the formation of the addition compound in an excess of the tertiary base on the theory that since the addition compound is insoluble in the base, it can be separated by filtration. Experience has shown, however, that such filtration is expensive, time-consuming and troublesome.

Other procedures recommend the use of anhydrous inorganic solvents in the reaction medium such as, for example, chlorohydrocarbons, i. e. chloroform, carbontetrachloride and the like. The use of these solvents, however, introduces uneconomical factors such as troublesome filtrations, recovery of the solvent and the like. To this date, no one has devised a simple economical method of producing the addition products in a high yield.

I have now discovered that the objections to the prior art procedures can be overcome while obtaining the addition products in a practically quantitative yield by reacting approximately equimolecular amounts of the tertiary base with sulfur trioxide in an apparatus permitting efficient cooling and thorough intimate mixing of the reactants, to effect complete conversion of the sulfur trioxide which is added slowly to the base. This procedure constitutes the purposes and objects of the present invention.

The process is carried out by cooling 1.1 to 1.2 mols of the tertiary base to zero to 10° C. in an apparatus which permits efficient cooling and thorough admixing of the reactants. For this purpose there may be used a Werner-Pfleiderer or a similar apparatus having the above prerequisites. About a mol of sulfur trioxide is then gradually introduced with efficient mixing.

As the introduction of the sulfur trioxide progresses, the temperature is not permitted to go above 40° C. The mass gradually thickens until finally, when all of the sulfur trioxide has been added, a rather dry powder is obtained which can be discharged from the apparatus and used without further purification for the esterification of leuco vat dyes.

The tertiary organic base which is employed may be aliphatic such as trimethylamine, triethylamine, tripropylamine, tributylamine, triallylamine and the like; araliphatic such as dimethylbenzylamine, diethylbenzylamine and the like; alicyclic such as cyclohexyldimethylamine, cyclohexyldiethylamine and the like; or heterocyclic such as N-methyl morpholine, pyridine, α-picoline, N-ethyl morpholine and the like.

The sulfur trioxide employed may be derived from various sources. Commercial grades of sulfur trioxide or sulfur trioxide obtained by heating oleum are suitable.

It has been found that if reasonable care be exercised in carrying out my process, the formation of lumps containing unreacted sulfur trioxide, a rather common occurrence where anhydrous inert diluents are employed, is avoided.

Furthermore the slight excess of tertiary amine insures complete reaction so that the yield of addition product is practically quantitative.

The invention is further illustrated by the following examples in which the parts are by weight. It is to be understood, however, that the invention is not limited to these specific examples.

Example 1

276.5 parts of dry 2° C. pyridine are charged into a laboratory size Werner-Pfleiderer designed with efficient kneading action. The pyridine is cooled to 0–5° C. by circulating brine through the jacket of the Werner-Pfleiderer.

240 parts of sulfur trioxide are added to the continuously stirred pyridine solution at such a rate that the temperature never exceeds 20° C. (The amount of sulfur trioxide added is always slightly less than the equivalent amount of sulfur trioxide necessary for stoichiometric proportions.)

The reaction mass is then gradually heated to 35° C. to insure complete reaction, maintained at this temperature for one hour and discharged from the Werner-Pfleiderer.

The nearly white product is obtained in almost quantitative yields. It can be used as an esterifying agent to prepare leuco sulfuric acid esters of vat dyestuffs in aqueous medium as described in the procedures of United States Patent No. 2,507,944.

Example 2

335 parts of commercial grade refined mixed picolines (mixture of the β- and γ-isomers) are charged into a laboratory Werner-Pfleiderer and then cooled to 0–5° C. by means of circulating brine in the jacket. There is now added slightly less than an equivalent amount of sulfur trioxide, as for example 240 parts in the manner described in Example 1. After the addition of the sulfur trioxide has been completed, the temperature of the reaction mass is increased slowly to 30–40° C. while continuously kneading the mass. After about one hour at this temperature, the nearly white product is obtained in quantitative yield.

Example 3

315 parts of a commercial mixture containing approximately 70% of the isomeric picolines and 30% of pyridine are charged into a laboratory Werner-Pfleiderer and converted to the sulfur trioxide addition product by the addition of 240 parts of sulfur trioxide according to the procedure described in Example 1. The white product is obtained in quantitative yield. The addition product is used for the preparation of leuco sulfuric acid esters of vat dyestuffs as described in United States Patent No. 2,507,944.

*Example 4*

201 parts 4-ethyl morpholine are charged into the laboratory Werner-Pfleiderer and cooled to 5–10° C. There are then added in the manner described in Example 1

120 parts of sulfur trioxide. The 4-ethylmorpholine-sulfur trioxide compound, obtained in a high yield, is of sufficient purity to use directly in the preparation of leucosulfuric acid esters of vat dyestuffs as described in United States Patent No. 2,403,226.

It is to be understood that any of the aforementioned tertiary bases may be used in lieu of those mentioned in the specific examples, without altering the process to any extent.

Modifications of the invention will occur to persons skilled in the art and I, therefore, do not intend to be limited in the patent granted except as necessitated by the appended claims.

I claim:
1. Process of producing an addition product of a tertiary organic base and sulfur trioxide which consists in cooling a stoichiometric amount of a tertiary organic base selected from the group consisting of pyridine, N-methyl morpholine, N-ethyl morpholine and picolines to a temperature ranging from zero to 10° C., and gradually adding slightly less than the stoichiometric amount of sulfur trioxide thereto while thoroughly mixing the same and while maintaining the temperature below 40° C.

2. The process as defined in claim 1 wherein the base is pyridine.

3. The process as defined in claim 1 wherein the base is a mixture of picolines.

4. The process as defined in claim 1 wherein the base is 4-ethylmorpholine.

References Cited in the file of this patent

UNITED STATES PATENTS

| | | |
|---|---|---|
| 1,835,841 | Beckett | Dec. 8, 1931 |
| 2,386,693 | Lecher | Oct. 9, 1945 |
| 2,396,582 | Lecher | Mar. 12, 1946 |
| 2,403,226 | Lecher | July 2, 1946 |
| 2,507,944 | Taras | May 16, 1950 |

FOREIGN PATENTS

| | | |
|---|---|---|
| 535,147 | Germany | Sept. 17, 1931 |

OTHER REFERENCES

Beilstein: Ber. Deut. Chem., vol. 16, No. I, 1883, p. 1265.

Wilcox: Am. Chem. J., vol. 32, 1904, pp. 446–57.

"Reactions of $SO_3$," Tech. Ser. Bull., SF–2 Allied Chemical and Dye Corp., 40 Rector St., New York 6, N. Y., 1940, pp. 1, 11, 12, 18 and 19.